United States Patent
Zhang et al.

(10) Patent No.: US 12,142,296 B2
(45) Date of Patent: Nov. 12, 2024

(54) AUDIO PROCESSING METHOD AND APPARATUS, AND ELECTRONIC DEVICE AND STORAGE MEDIUM

(71) Applicant: Beijing Zitiao Network Technology Co., Ltd., Beijing (CN)

(72) Inventors: Wenwen Zhang, Beijing (CN); Weiming Zheng, Beijing (CN); Wanli Che, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/395,295

(22) Filed: Dec. 22, 2023

(65) Prior Publication Data

US 2024/0127856 A1  Apr. 18, 2024

Related U.S. Application Data

(63) Continuation of application No. PCT/CN2022/119535, filed on Sep. 19, 2022.

(30) Foreign Application Priority Data

Sep. 28, 2021 (CN) .......................... 202111145023.8

(51) Int. Cl.
  *G11B 27/02* (2006.01)
  *G06F 3/16* (2006.01)
  (Continued)

(52) U.S. Cl.
  CPC .............. *G11B 27/02* (2013.01); *G06F 3/165* (2013.01)

(58) Field of Classification Search
  CPC ......... G11B 27/02; G11B 27/00; G06F 3/165; H04N 1/00167; H04N 21/00
  (Continued)

(56) References Cited

U.S. PATENT DOCUMENTS 10,296,959 B1 * 5/2019 Chernikhova ..... G06Q 30/0631
10,966,047 B1 * 3/2021 Tong ...................... H04R 5/033
(Continued)

FOREIGN PATENT DOCUMENTS

| CN | 101692693 A | 4/2010 |
| CN | 106803910 A | 6/2017 |

(Continued)

OTHER PUBLICATIONS

International Patent Application No. PCT/CN2022/119535; Int'l Search Report; dated Jan. 3, 2023; 3 pages.
(Continued)

*Primary Examiner* — Daquan Zhao
(74) *Attorney, Agent, or Firm* — BakerHostetler (57) ABSTRACT

Disclosed in the embodiments of the present disclosure are an audio processing method and apparatus, and an electronic device and a storage medium. The method comprises: in response to a trigger operation of entering a video editing page for a target video for the first time, displaying the video editing page; and if original audio in the target video meets a preset condition, performing sound repair processing on the original audio while displaying the video editing page, and displaying, in the video editing page, a target control in a first state, wherein the target control in the first state is used for indicating that the sound repair processing is being performed on the original audio.

17 Claims, 6 Drawing Sheets

Displaying a video editing page for a target video, in response to a trigger operation of entering the video editing page for the first time — 110

Carrying out tuning processing on an original audio while displaying the video editing page if the original audio in the target video meets a preset condition, and displaying, on the video editing page, a target control in a first state, which is used for indicating that the tuning processing is being carried out on the original audio — 120

When carrying out the tuning processing on the original audio, performing an edit operation corresponding to an edit control on the target video in response to a trigger operation acting on the edit control, at least one said edit control being displayed on the video editing page — 130

(51) Int. Cl.
  *G11B 27/00* (2006.01)
  *H04N 21/00* (2011.01)
(58) Field of Classification Search
  USPC ............... 386/285, 278, 280, 282, 239, 248
  See application file for complete search history.

(56) References Cited

U.S. PATENT DOCUMENTS

| | | | | |
|---|---|---|---|---|
| 2012/0210231 | A1* | 8/2012 | Ubillos | ............... G11B 27/034 |
| | | | | 715/723 |
| 2015/0220249 | A1* | 8/2015 | Snibbe | .................... H04L 67/10 |
| | | | | 715/719 |
| 2022/0130360 | A1 | 4/2022 | Tao et al. | |
| 2022/0319548 | A1 | 10/2022 | Che et al. | |
| 2023/0307004 | A1 | 9/2023 | Li et al. | |

FOREIGN PATENT DOCUMENTS

| | | |
|---|---|---|
| CN | 108281152 A | 7/2018 |
| CN | 108665881 A | 10/2018 |
| CN | 109817237 A | 5/2019 |
| CN | 110010162 A | 7/2019 |
| CN | 110265067 A | 9/2019 |
| CN | 110289024 A | 9/2019 |
| CN | 111432290 A | 7/2020 |
| CN | 111787986 A | 10/2020 |
| CN | 112073649 A | 12/2020 |
| CN | 112165647 A | 1/2021 |
| CN | 306620916 S | 6/2021 |
| CN | 113079419 A | 7/2021 |
| CN | 113207025 A | 8/2021 |
| CN | 113891151 A | 1/2022 |
| WO | WO 2019/165723 A1 | 9/2019 |
| WO | WO 2023/061057 A1 | 4/2023 |

OTHER PUBLICATIONS

International Patent Application No. PCT/CN2022/119535; Int'l Written Opinion; dated Jan. 3, 2023; 3 pages.
European Patent Application No. 22874680.6; Extended Search Report; dated Sep. 20, 2024; 11 pages.

* cited by examiner

AUDIO PROCESSING METHOD AND APPARATUS, AND ELECTRONIC DEVICE AND STORAGE MEDIUM

The present application is a continuation of International Application No. PCT/CN2022/119535, filed on Sep. 19, 2022, which claims priority to Chinese Patent Application No. 202111145023.8, entitled "AUDIO PROCESSING METHOD AND APPARATUS, AND ELECTRONIC DEVICE AND STORAGE MEDIUM", filed on Sep. 28, 2021, the disclosure of which is incorporated by reference herein in its entirety.

TECHNICAL FIELD

The present disclosure relates to the field of information technologies, and in particular to an audio processing method and apparatus, an electronic device, and a storage medium.

BACKGROUND

With the rapid development of terminal technologies and network technologies, current video-type applications usually have functions of publishing works and the like. By using the video-type applications, a user can compose, such as recording audio/video, and etc.

However, related statistical data show that there are a large number of users who compose based on the video-type applications, while there are a small number of users who publish works. The reason for this may be that the works composed by users based on the video-type applications are of poor quality.

Therefore, how to improve the composing quality of users is a main problem to be solved.

SUMMARY

In order to solve the above technical problem or at least partially solve the above technical problem, embodiments of the present disclosure provide an audio processing method and apparatus, an electronic device, and a storage medium. The quality of the original audio can be improved, and a better audio playback effect can be obtained.

In a first aspect, an embodiment of the present disclosure provides an audio processing method, the method including:
  displaying a video editing page for a target video, in response to a trigger operation of entering the video editing page for the first time;
  wherein if an original audio in the target video meets a preset condition, carrying out tuning processing on the original audio while displaying the video editing page, and displaying, on the video editing page, a target control in a first state, which is used for indicating that the tuning processing is being carried out on the original audio;
  while carrying out the tuning processing on the original audio, performing an edit operation corresponding to an edit control on the target video in response to a trigger operation acting on the edit control, at least one said edit control being displayed on the video editing page.

In a second aspect, an embodiment of the present disclosure further provides an audio processing apparatus, the apparatus including:
  a first displaying module for displaying a video editing page for a target video, in response to a trigger operation of entering the video editing page for the first time;
  a processing module for carrying out tuning processing on an original audio while displaying the video editing page, if the original audio in the target video meets a preset condition;
  the first displaying module is further used for displaying, on the video editing page, a target control in a first state, which is used for indicating that the tuning processing is being carried out on the original audio;
  an editing module for performing, while the tuning processing is carried out on the original audio, an edit operation corresponding to an edit control on the target video in response to a trigger operation acting on the edit control, at least one said edit control being displayed on the video editing page.

In a third aspect, an embodiment of the present disclosure further provides an electronic device, the electronic device including:
  one or more processors;
  storage for storing one or more programs;
  the one or more programs, when being executed by the one or more processors, cause the one or more processors to implement the above-mentioned audio processing method.

In a fourth aspect, an embodiment of the present disclosure further provides a computer readable storage medium, on which a computer program is stored, which, when being executed by the processor, implements the above-mentioned audio processing method.

In a fifth aspect, an embodiment of the present disclosure further provides a computer program product including a computer program or instructions which, when being executed by the processor, implement the above-mentioned audio processing method.

BRIEF DESCRIPTION OF THE DRAWINGS

The above and other features, advantages, and aspects of embodiments of the present disclosure will become more apparent with reference to the following specific implementations in conjunction with the accompanying drawings. Throughout the accompanying drawings, identical or similar reference signs represent identical or similar elements. It should be understood that the accompanying drawings are schematic and that components and elements are not necessarily drawn to scale.

DETAILED DESCRIPTION

Embodiments of the present disclosure will be described in more detail below with reference to the accompanying drawings. While certain embodiments of the present disclosure are shown in the accompanying drawings, it should be understood that the present disclosure can be implemented in various forms and should not be construed as limited to the embodiments set forth herein, but rather are provided for a more thorough and complete understanding of the present disclosure. It should be understood that the accompanying drawings and the embodiments of the present disclosure are for illustration purposes only and are not intended to limit the scope of the present disclosure.

It should be understood that the various steps recited in method implementation of the present disclosure can be performed in a different order, and/or performed in parallel. Moreover, the method implementation can include additional steps and/or omit performing the illustrated steps. The scope of the present disclosure is not limited in this respect.

The term "include" and variations thereof as used herein is intended to be open-ended, i.e., "including but not limited to". The term "based on" is "based at least in part on". The term "one embodiment" means "at least one embodiment"; the term "another embodiment" means "at least one additional embodiment"; the term "some embodiments" means "at least some embodiments". Relevant definitions for other terms will be given below.

It should be noted that the terms "first", "second", and other concepts mentioned in the present disclosure are only used for distinguishing different means, modules or units, and are not used for limiting the order or interdependence of the functions performed by these means, modules or units.

It should be noted that reference to "one" or "more" in the present disclosure are intended to be illustrative rather than limiting, and that those skilled in the art should understand that it should be understood as "one or more" unless the context clearly indicates otherwise.

The names of messages or information exchanged between apparatuses in the implementations of the present disclosure are for illustrative purposes only, and are not intended to limit the scope of the messages or information.

Figure 1:
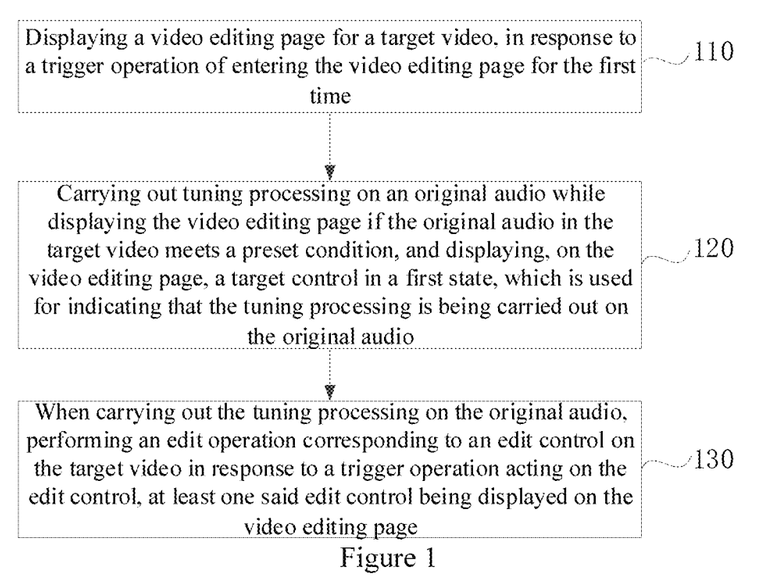
FIG. 1 is a flow diagram of an audio processing method in an embodiment of the present disclosure.

FIG. 1 is a flow diagram of an audio processing method in an embodiment of the present disclosure. The present embodiment is applicable to a scene where a video is recorded in a video client, typically in a karaoke recording scene, which is used for improving a singing effect of a user and beautifying a singing audio of the user. The method can be performed by an audio processing apparatus, which can be implemented by means of software and/or hardware, and can be configured in an electronic device, such as a terminal, specifically including but not limited to a smart phone, a palm computer, a tablet computer, a wearable device with a display screen, a desktop computer, a notebook computer, an all-in-one machine, a smart home device, and the like.

As shown in FIG. 1, the method can specifically include the following steps:

step 110, displaying a video editing page for a target video, in response to a trigger operation of entering the video editing page for the first time.

The target video can be recorded by a user in real time. For example, the user records or shoots the target video through a shooting page of a video application, and then jumps to a video editing page for the target video based on the shooting page of the video application, where this process is entering the video editing page for the target video for the first time. The target video can also be a certain video selected from a user album, which may be a certain video previously recorded or downloaded by the user.

Specifically, the target video can be a video recorded in a karaoke scene and including a singing audio of the user. In the karaoke scene, the user can select a certain song as a preset reference audio through a video application. Lyrics of the preset reference audio are displayed on a recording page of the video application. When a camera of the video application is turned on, the portrait of the user can also be displayed on the recording page, and if the camera of the video application is turned off (the user can control the off and on of the camera in a self-defined way), a preset picture, such as an MV picture carried by a song, can also be displayed on the recording page.

In some embodiments, target prompt information is also displayed on the recording page of the Karaoke scene, and the target prompt information is determined based on attributive characteristics of the song selected by the user and the recording behavior of the user. Specifically, if there is a tuning resource (for example, a midi file) corresponding to the song selected by the user in the video application or in the server associated with the video application, in other words, if the song selected by the user supports intelligent tuning, the target prompt information 1 can be "Current song can support intelligent tuning, please wear wired earphones throughout recording". The target prompt information is used for prompting the user to wear wired earphones throughout the recording, and by wearing the wired earphones, the recorded audio has a better effect and better quality, which can provide high-quality original resources for intelligent tuning, and guarantee the user to record a better audio. If there is no tuning resource (which can be e.g. a midi file) corresponding to the song selected by the user in the video application or in the server associated with the video application, in other words, if the song selected by the user does not support intelligent tuning and it is detected that the user does not wear wired earphones but wireless earphones with poor performance, then the target prompt information 2 can be "Microphone will be started for recording due to performance of earphones". If there is no tuning resource (e.g., a midi file) corresponding to the song selected by the user in the video application or in the server associated with the video application, in other words, if the song selected by the user does not support intelligent tuning and the user does not use earphones but a microphone for recording, then the target prompt information 3 can be "Better effect with earphones".

In some embodiments, no matter whether the song selected by the user supports the intelligent tuning or not, the target prompt information 1, the target prompt information 2 and the target prompt information 3 as the above are displayed sequentially in turn. By displaying the target prompt information on the recording page, the recording behavior of the user can be correctly guided, and the user is guided to record a better singing audio, which can improve the use experience of the user.

Figure 2:
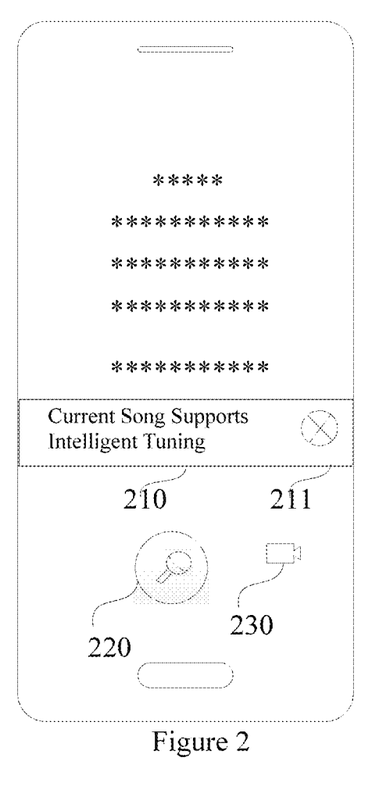
FIG. 2 is a schematic diagram of a video recording page in an embodiment of the present disclosure.

Generally, on the recording page of the target video, target prompt information is displayed based on attributive characteristics of a preset reference audio (i.e. an audio of the song selected by a user) and/or the recording behavior of the user, wherein the audio in the target video is obtained by recording based on the preset reference audio. Illustratively, with reference to FIG. 2, which shows a schematic interface diagram of a video recording page in a karaoke scene, lyrics of a song selected by a user, a preset portrait (a background image lying below the lyrics), and target prompt information 210 are displayed, and when the user triggers a record control 220, recording is started. The state of the camera can be switched by triggering a camera control 230, for example, turning the camera on or off. It should be noted that, since the display area is limited, if the target prompt information 210 has more words, it can be scroll-displayed in form of a "ticker". In some embodiments, the target prompt information 210 is displayed only before the recording, and when the user triggers the record control 220 to start recording, the displaying of the target prompt information 210 is cancelled; the user can also manually turn off the displaying of the target prompt information 210 by triggering a close control "x" 211.

Step 120, if an original audio in the target video meets a preset condition, carrying out tuning processing on the original audio while displaying the video editing page, and displaying, on the video editing page, a target control in a first state, which is used for indicating that the tuning processing is being carried out on the original audio.

The preset condition can be that there is a tuning resource corresponding to the song selected by the user in the video application or in the server associated with the video application and that the user wears wired earphones throughout the recording process. In other words, there is a corresponding tuning resource for the original audio in the target video, and the original audio is recorded by wearing wired earphones throughout recording. If the original audio in the target video meets the preset condition, then tuning processing is carried out on the original audio when entering the video editing page, without requiring the user to trigger a related tuning control to perform tuning processing on the original video, which realizes the automatic processing on the original audio and can improve the processing efficiency of the original audio and the user experience. In order to enable a user to know the tuning processing carried out on original audio, a target control in a first state is displayed on the video editing page, which is used for indicating that tuning processing is being carried out on the original audio, so that the user can be informed, in time, of related processing carried out for the original audio.

Figure 3:
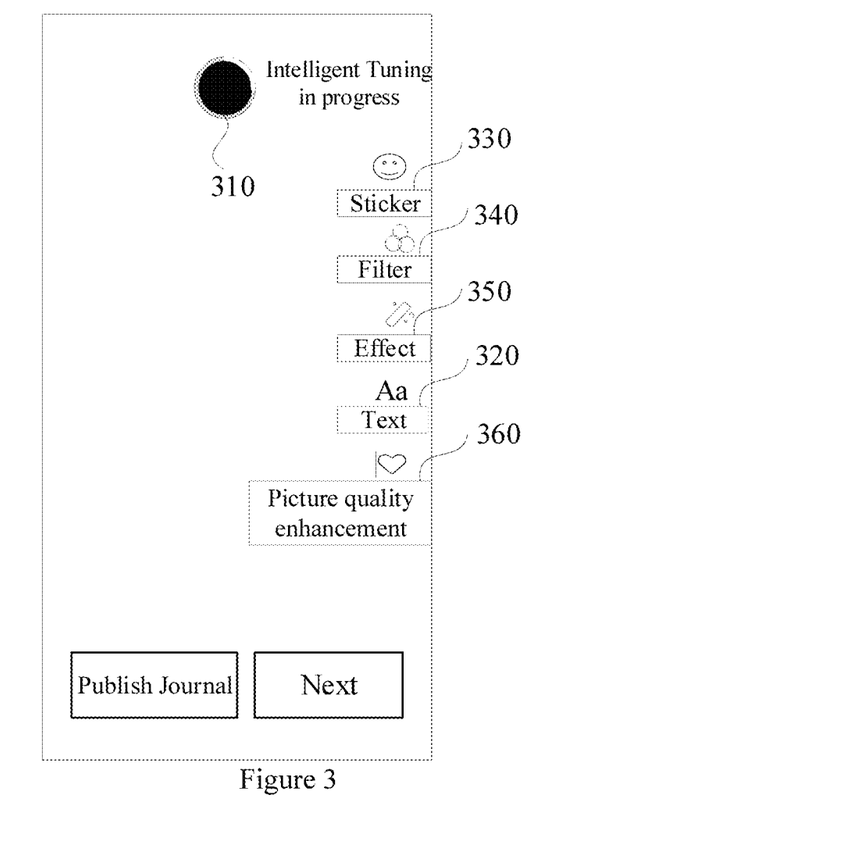
FIG. 3 is a schematic diagram of a video editing page in an embodiment of the present disclosure.

Illustratively, with reference to a schematic diagram of a video editing page as shown in FIG. 3, is displayed a target control 310 in a first state, which is used for prompting a user that the tuning processing is being carried out on the original audio in the target video.

Step 130, when carrying out the tuning processing on the original audio, performing an edit operation corresponding to an edit control on the target video in response to a trigger operation acting on the edit control, at least one said edit control being displayed on the video editing page.

Illustratively, with reference to a schematic diagram of a video editing page as shown in FIG. 3, at least one edit control, such as a "text" control 320, a "sticker" control 330, a "filter" control 340, an "effect" control 350, or an "picture quality enhancement" control 360, are displayed on the video editing page. When the tuning processing is carried out on the original audio, if an operation of a user triggering the "text" control 320 is received, then an editing page for adding text is displayed; and if an operation of the user triggering the "filter" control 340 is received, then filter processing is carried out on the target video. That is, in the process of carrying out the tuning processing on the original audio, the user's other edit operations on the target video will not be influenced, for example, the user can perform edit operations such as adding a filter, text, sticker, or picture quality enhancement, or the like, for the target video. In other words, in the process of carrying out automatic audio modification processing on the original audio, the user can manually carry out other edit operations, such as adding text, a sticker or a filter, for the target video according to his or her own requirements. By doing so, when the tuning processing for the original audio is completed, the other edit operations manually carried out by the user are also generally completed, which can further increase the editing efficiency for the target video and save the user time so as to reach the purpose of improving the user experience, as compared with manually carrying out the other edit operations after waiting until completion of the tuning processing.

In some implementations, the original audio is played while the video editing page is displayed; and when it is detected that the tuning processing is completed, the tuned audio continues to be played from the playback progress point of the original audio when the tuning processing is completed. For example, the tuning processing takes a time period of 3 second, when the tuning processing is completed, the playback progress of the original audio reaches a point of 3 second, and the tuned audio continues to be played from the point of 3 second, rather than from the start of the original audio, namely, the playback progress point of 0 second.

Figure 4:
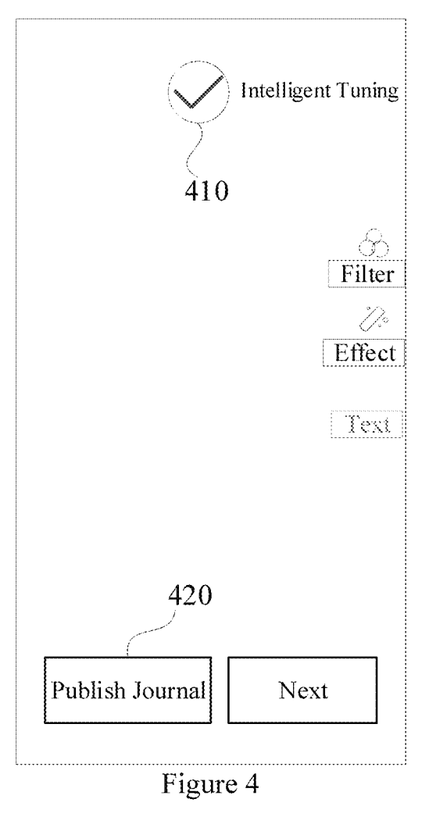
FIG. 4 is a schematic diagram of a video editing page in an embodiment of the present disclosure.

In some implementations, with reference to a schematic diagram of a video editing page as shown in FIG. 4, is displayed a target control 410 in a second state, which is used for indicating that the tuning processing for the original audio is completed. Generally, when it is detected that the tuning processing is completed, the state of the target control is controlled to switch to the second state, and the target control in the second state is used for indicating that the tuning processing for the original audio is completed.

Figure 5:
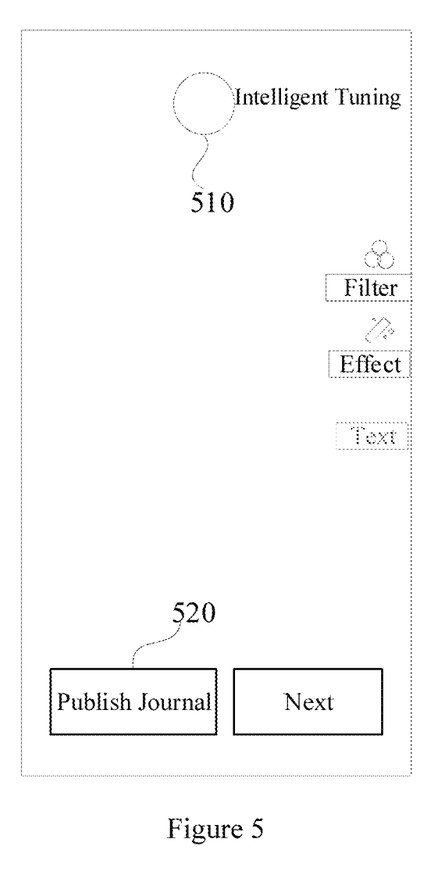
FIG. 5 is a schematic diagram of a video editing page in an embodiment of the present disclosure.

In some implementations, when the user triggers the target control 410, the state of the target control 410 is controlled to switch to a third state. As shown in FIG. 5 is a target control 510 in the third state, which is used for prompting that the tuning processing is not carried out on the original audio. Starting from the state of the target control 510 being switched to the third state, the original audio continues to be played from the current playback progress point on the video editing page, and the tuned audio is no longer played. Generally, in response to the operation of switching the state of the target control from the second state to the third state, the original audio continues to be played from the current playback progress point; and when the target control is in the second state, the audio after tuning processing is played on the video editing page. For example, the original audio is played since entering the video editing page, and meanwhile the tuning processing is automatically carried out on the original audio, and the state of the target control is the first state. It is assumed that the tuning processing is completed at the 3rd second, then the state of the target control is switched from the first state to the second state, and at this moment the playback progress of the original audio reaches the 3rd second. The tuned audio is played from the playback progress of the 4th second, and if the user switches the state of the target control from the second state to the third state at the 6th second, then the original audio continues to be played from the playback progress of the 7th second.

In some implementations, in response to a trigger operation acting on a publish control (e.g., a publish control 420 in FIG. 4 or a publish control 520 in FIG. 5), the target video including the tuned audio is published if the target control is in the second state, and the target video including the original audio is published if the target control is in the third state. That is, when publishing the target video, the user can select whether to publish the audio after tuning or the original audio before tuning. By providing multiple choices for the user, the personalized requirements of different users can be met respectively. For example, some users feel that they sing better by themselves and do not like the tuning effect after tuning, and then the users can switch the state of the target control to a third state before publishing the target video; in contrast, some users feel that they are tone deaf and sing poorly and prefer the tuning effect after tuning, and then these users can switch the state of the target control to the second state before publishing the target video.

In some implementations, in response to an operation of returning to the video editing page after exiting from the video editing page, the video editing page including the target control is displayed, wherein, if the original audio is not changed, then the state of the target control is controlled to be consistent with the state of the target control when exiting from the video editing page. That is, if the user exits from the video editing page but does not change the original audio, the state of the target control at the exit is maintained when the user enters the video editing page again, and the tuning processing is not carried out on the original audio again. For example, in case where the state of the target control is the first state "tuning in progress" when the user exits from the video editing page, if the user does not change the original audio after exiting from the video editing page, then the tuning processing continues to be carried out on the original audio when the user returns to the video editing page again, and the state of the target control is maintained as the first state "tuning in progress"; if the original audio is changed, then the tuning processing is automatically carried out on the changed original audio when the user returns to the video editing page again, and the state of the target control is the first state "tuning in progress". In case where the state of the target control is the second state "completion of tuning" when the user exits from the video editing page, if the user does not change the original audio after exiting from the video editing page, then the tuning processing is not carried out on the original audio again when the user returns to the video editing page again, but the audio, for which the tuning processing has been previously completed, is directly called, and the state of the target control is maintained as the second state "completion of tuning"; if the original audio is changed, then the tuning processing is automatically carried out on the changed original audio when the user returns to the video editing page again, and the state of the target control is the first state "tuning in progress". In case where the state of the target control is the third state "no tuning" when the user exits from the video editing page, if the user does not change the original audio after exiting from the video editing page, then the state of the target control is maintained as the third state "no tuning" when the user returns to the video editing page again, and then if the user switches the state of the target control to the second state "completion of tuning", the tuning processing is not carried out on the original audio again, but the audio, for which the tuning processing has been previously completed, is directly called; if the original audio is changed, then the state of the target control is maintained as the third state "no tuning" when the user returns to the video editing page again, and then if the user switches the state of the target control to the second state "completion of tuning", the tuning processing is automatically carried out on the changed original audio, and the state of the target control is controlled to be the first state "tuning in progress".

In some implementations, the displaying the video editing page including the target control, in response to an operation of returning to the video editing page after exiting from the video editing page, includes: in response to trigger operations of entering a video recording page after exiting from a video editing page, and returning to the video editing page after exiting from the video recording page, if the state of the target control is a first state or a second state when exiting from the video editing page, carrying out the tuning processing on the changed original audio while displaying the video editing page, and displaying a target control in the first state on the video editing page; or, in response to trigger operations of entering a video recording page after exiting from the video editing page, and returning to the video editing page after exiting from the video recording page, if the state of the target control is a third state when exiting from the video editing page, displaying the video editing page; in response to an operation of switching the state of the target control from the third state to the second state, carrying out the tuning processing on the changed original audio, and displaying the target control in the first state on the video editing page.

In some implementations, the displaying the video editing page including the target control, in response to an operation of returning to the video editing page after exiting from the video editing page, includes: in response to trigger operations of entering a video publishing page after existing from a video editing page, and returning to the video editing page after existing from the vide publishing page, displaying the video editing page including the target control, and controlling the state of the target control to be consistent with the state of the target control when exiting from the video editing page.

Specifically, whether the original audio is changed or not can be determined based on a target page the user enters after exiting from the video editing page. For example, if the user enters a video recording page after exiting from the video editing page, the original audio can be considered to be changed when the user returns to the video editing page again from the video recording page; if the user enters the video publishing page after exiting from the video editing page, the original audio can be considered to be not changed when the user returns to the video editing page again from the video publishing page.

The audio processing method provided by the embodiment of the present disclosure includes, when entering a video editing page for the first time, automatically carrying out tuning processing on an original audio in the video, and displaying, on the video editing page, a target control in a first state, which is used for indicating that the tuning processing is being carried out on the original audio. Intelligent tuning on the original audio can be realized, the quality of the original audio can be improved, and a better audio playback effect can be obtained. The audio processing method prompts, by the target control in the first state, a user that the tuning processing is being currently carried out on the original video, so that the user can obtain a better interactive experience. In the process of carrying out the tuning processing on the original audio, the user's other edit operations on the target video will not be influenced, so that the user experience can be further improved, and the editing efficiency can be increased.

Figure 6:
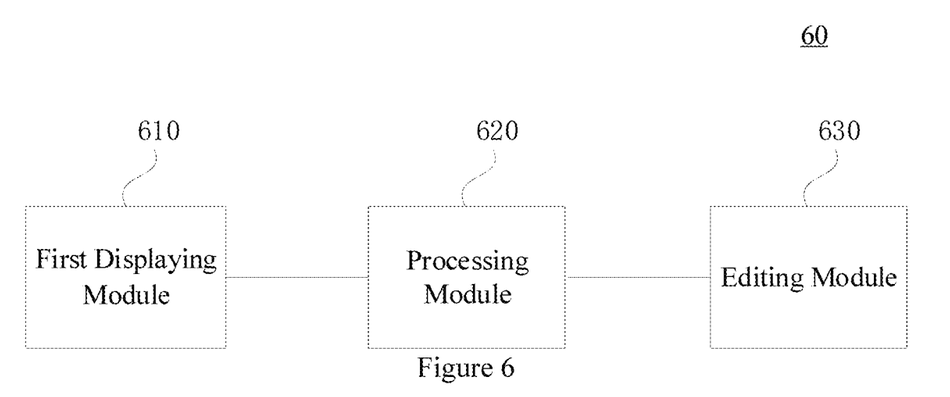
FIG. 6 is a schematic structural diagram of a video processing apparatus in an embodiment of the present disclosure.

FIG. 6 is a schematic structural diagram of an audio processing apparatus in an embodiment of the present disclosure. The audio processing apparatus provided by the embodiment of the present disclosure can be configured in a client, and the audio processing apparatus 60 specifically includes: a first displaying module 610, a processing module 620, and an editing module 630.

The first displaying module 610 is used for displaying a video editing page for a target video, in response to a trigger operation of entering the video editing page for the first time; the processing module 620 is used for carrying out tuning processing on an original audio while displaying the video editing page, if the original audio in the target video meets a preset condition; the first displaying module 610 is further used for displaying, on the video editing page, a target control in a first state, which is used for indicating that the tuning processing is being carried out on the original audio; and the editing module 630 is used for performing, while carrying out the tuning processing on the original audio, an edit operation corresponding to an edit control on the target video in response to a trigger operation acting on the edit control, at least one said edit control being displayed on the video editing page.

In some embodiments, the audio processing apparatus further includes: a playing module for playing the original audio while displaying the video editing page; and when completion of the tuning processing is detected, continuing to play the tuned audio from the playback progress point of the original audio at the completion of the tuning processing.

In some embodiments, the audio processing apparatus further includes: a controlling module for controlling the state of the target control to switch to a second state when completion of the tuning processing is detected, wherein the target control in the second state is used for indicating that the tuning processing for the original audio is completed.

In some embodiments, the playing module is further used for continuing to play the original audio from the current playback progress point in response to an operation of switching the state of the target control from the second state to a third state; and playing the audio after tuning processing on the video editing page, when the target control is in the second state.

In some embodiments, the audio processing apparatus further includes: a publishing module for, in response to a trigger operation acting on a publish control, publishing the target video including the audio after tuning processing, if the target control is in the second state, and publishing the target video including the original audio if the target control is in the third state.

In some embodiments, the first displaying module is further used for, in response to operations of exiting from the video editing page, entering a preset page, and returning to the video editing page from the preset page, displaying the video editing page and controlling the state of the target control to be consistent with the state of the target control when exiting from the video editing page.

In some embodiments, the first displaying module is specifically used for, in response to trigger operations of entering a video recording page after exiting from the video editing page, and returning to the video editing page after exiting from the video recording page, if the state of the target control is a first state or a second state when exiting from the video editing page, then carrying out tuning processing on the changed original audio while displaying the video editing page, and displaying a target control in the first state on the video editing page; or, in response to trigger operations of entering a video recording page after exiting from the video editing page, and returning to the video editing page after exiting from the video recording page, if the state of the target control is a third state when exiting from the video editing page, displaying the video editing page; and in response to an operation of switching the state of the target control from the third state to the second state, carrying out the tuning processing on the changed original audio, and displaying the target control in the first state on the video editing page.

In some embodiments, the first displaying module is specifically used for, in response to trigger operations of entering a video publishing page after existing from the video editing page, and returning to the video editing page after existing from the vide publishing page, displaying the video editing page including the target control, and controlling the state of the target control to be consistent with the state of the target control when exiting from the video editing page.

In some embodiments, the video processing apparatus further comprises: a second displaying module for displaying, on a recording page of the target video, target prompt information based on attributive characteristics of a preset reference audio and/or the recording behavior of a user, wherein the audio in the target video is obtained by recording based on the preset reference audio.

In some examples, the original audio in the target video meets a preset condition, including: there is a corresponding tuning resource for the original audio in the target video, and the original audio is recorded by wearing wired earphones throughout recording.

The audio processing apparatus provided by the embodiment of the present disclosure can perform the steps performed by the client in the audio processing method provided by the method embodiment of the present disclosure, and the steps and the beneficial effects are not described herein again.

Figure 7:
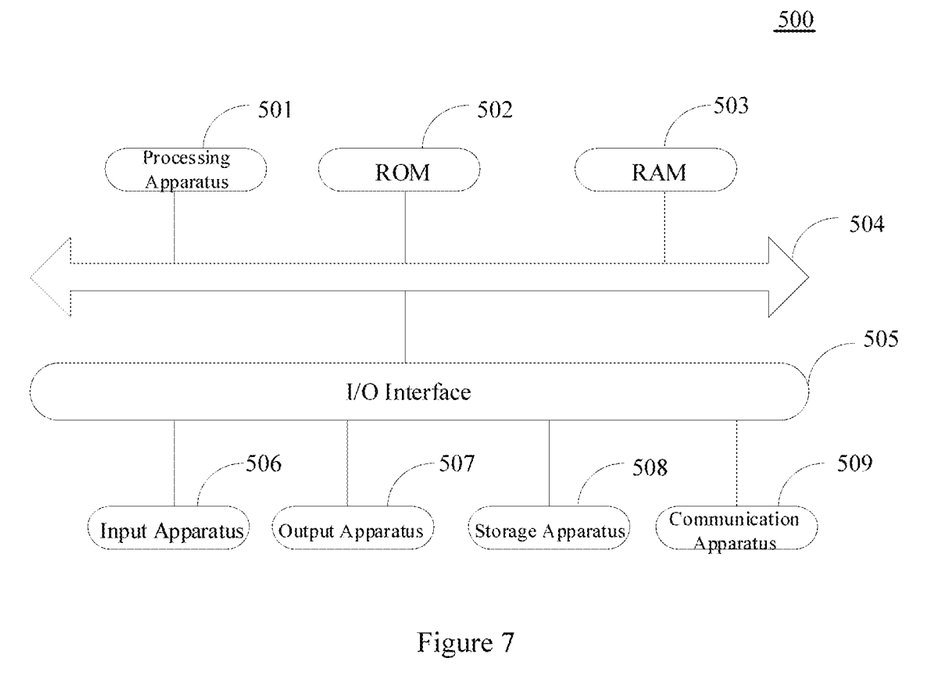
FIG. 7 is a schematic structural diagram of an electronic device in an embodiment of the present disclosure.

FIG. 7 is a schematic structural diagram of an electronic device in an embodiment of the present disclosure. With reference to FIG. 7 below, is shown a schematic structural diagram of an electronic device 500 adaptive for implementing the embodiments of the present disclosure. The electronic device 500 in the embodiment of the present disclosure can include, but is not limited to, mobile terminals such as a mobile phone, a notebook computer, a digital broadcast receiver, a personal digital assistant (PDA), a tablet computer (PAD), a portable multimedia player (PMP), a vehicle-mounted terminal (e.g., a vehicle-mounted navigation terminal), a wearable electronic device, and the like, as well as fixed terminals such as a digital TV, a desktop computer, a smart home device, and the like. The electronic device shown in FIG. 7 is only an example, and should not bring any limitation to the functions and the scope of use of the embodiments of the present disclosure.

As shown in FIG. 7, the electronic device 500 can include a processing apparatus (e.g., a central processor, a graphics processor, etc.) 501 that can perform various appropriate actions and processings according to a program stored in a Read Only Memory (ROM) 502 or a program loaded from a storage apparatus 508 onto a Random Access Memory (RAM) 503 so as to implement the audio processing method according to the embodiments of the present disclosure. In the RAM 503, are also stored various programs and data required for operations of the electronic device 500. The processing apparatus 501, the ROM 502, and the RAM 503 are connected to each other via a bus 504. An input/output (I/O) interface 505 is also connected to the bus 504.

Generally, the following apparatuses can be connected to the I/O interface 505: input apparatus 506 including, for example, a touch screen, a touch pad, a keyboard, a mouse, a camera, a microphone, an accelerometer, a gyroscope, and the like; output apparatus 507 including, for example, a Liquid Crystal Display (LCD), a speaker, a vibrator, and the like; storage apparatus 508 including, for example, a magnetic tape, a hard disk, and the like; and communication apparatus 509. The communication apparatus 509 can allow the electronic device 500 to carry out wireless or wired communication with other devices so as to exchange data. While FIG. 7 illustrates an electronic device 500 having various apparatuses, it should be understood that not all illustrated apparatuses are required to be implemented or provided. More or fewer apparatuses can be alternatively implemented or provided.

Particularly, the process described above with reference to the flow diagram can be implemented as a computer software program, according to the embodiments of the present disclosure. For example, the embodiment of the present disclosure includes a computer program product comprising a computer program carried on a non-transitory computer readable medium, the computer program containing program code for performing the method shown in the flow diagram, thereby implementing the audio processing method as described above. In such an embodiment, the computer program can be downloaded and installed from a network through the communication apparatus 509, or installed from the storage apparatus 508, or installed from the ROM 502. The computer program, when being executed by the processing apparatus 501, performs the above-described functions defined in the method of the embodiments of the present disclosure.

It should be noted that the above-described computer readable medium of the present disclosure can be a computer readable signal medium or a computer readable storage medium or any combination of both the above. The computer readable storage medium can be, for example, but not limited to, an electronic, magnetic, optical, electromagnetic, infrared, or semiconductor system, apparatus, or device, or any combination of the above. More specific examples of the computer readable storage medium can include, but are not limited to: an electrical connection having one or more wires, a portable computer diskette, a hard disk, a Random Access Memory (RAM), a Read Only Memory (ROM), an Erasable Programmable Read Only Memory (an EPROM or a flash memory), an optical fiber, a portable Compact Disc Read Only Memory (CD-ROM), an optical storage device, a magnetic storage device, or any suitable combination of the above. In the present disclosure, the computer readable storage medium can be any tangible medium that contains or stores a program for use by or in connection with an instruction execution system, apparatus, or device. In the present disclosure, the computer readable signal medium can include a propagated data signal in baseband or as part of a carrier wave with computer readable program code carried therein. Such a propagated data signal may take a variety of forms, including, but not limited to, an electromagnetic signal, an optical signal, or any suitable combination of the above. The computer readable signal medium can also be any computer readable medium other than the computer readable storage medium and can send, propagate, or transport a program for use by or in connection with an instruction execution system, apparatus, or device. Program code contained on the computer readable medium can be transferred using any appropriate medium, including but not limited to: electrical wires, optical cables, radio frequency (RF), etc., or any suitable combination of the above.

In some implementations, a client and a server can communicate using any currently known or future developed network Protocol, such as the HyperText Transfer Protocol (HTTP), and can be interconnected with any form or medium of digital data communication (e.g., a communication network). Examples of the communication network include a Local Area Network ("LAN"), a Wide Area Network ("WAN"), an internet (e.g., the Internet), and a peer-to-peer network (e.g., an ad hoc peer-to-peer network), as well as any currently known or future developed network.

The above-described computer readable medium can be contained in the above-described electronic device, or can be separate and not incorporated into the electronic device.

The above-described computer readable medium carries one or more programs which, when being executed by the electronic device, cause the electronic device to: display a video editing page in response to a trigger operation of entering the video editing page for a target video for the first time; if an original audio in the target video meets a preset condition, carry out tuning processing on the original audio while displaying the video editing page, and display, on the video editing page, a target control in a first state, which is used for indicating that the tuning processing is being carried out on the original audio; and while carrying out the tuning processing on the original audio, perform an edit operation corresponding to an edit control on the target video in response to a trigger operation acting on the edit control, at least one said edit control is displayed on the video editing page.

In some embodiments, when the above-described one or more programs are executed by the electronic device, the electronic device can also perform other steps described in the above embodiments.

Computer program code for executing operations of the present disclosure can be written in one or more programming languages or a combination thereof. The above-described programming languages include, but are not limited to, object oriented programming languages such as Java, Smalltalk, C++, as well as conventional procedural programming languages such as the "C" language or similar programming languages. Program code can be executed entirely on a user computer, partly on the user computer, as a stand-alone software package, partly on the user computer and partly on a remote computer, or entirely on the remote computer or a server. In circumstances where the remote computer is involved, the remote computer can be connected to the user computer through any type of network, including a Local Area Network (LAN) or a Wide Area Network (WAN), or can be connected to an external computer (for example, a connection through the Internet using an Internet service provider).

The flow diagrams and block diagrams in the accompanying drawings illustrate the architecture, functions, and operations of possible implementations of the system, the method and the computer program product according to various embodiments of the present disclosure. In this regard, each block in the flow diagrams or block diagrams can represent a module, a segment, or a portion of code, which contains one or more executable instructions for implementing the specified logical function(s). It should also be noted that, in some alternative implementations, the functions labeled in the blocks can also occur out of the order labeled in the accompanying drawings. For example, two blocks shown in succession can, in fact, be executed substantially in parallel, or they can be sometimes executed in the reverse order, depending upon the functions involved. It should be also noted that each block of the block diagrams and/or flow diagrams, and a combination of blocks in the block diagrams and/or flow diagrams, can be implemented by a dedicated hardware-based system that perform the specified functions or operations, or by a combination of dedicated hardware and computer instructions.

The involved units as described in the embodiments of the present disclosure can be implemented by means of software or hardware. The name of a unit does not in some cases constitute a limitation on the unit itself.

The functions described herein above can be performed, at least in part, by one or more hardware logic components. For example, without limitation, available exemplary types of hardware logic components include: Field Programmable Gate Arrays (FPGAs), Application Specific Integrated Circuits (ASICs), Application Specific Standard Products (ASSPs), Systems on Chip (SOCs), Complex Programmable Logic Devices (CPLDs), and the like.

In the context of the present disclosure, a machine readable medium can be a tangible medium that can contain or store a program for use by or in connection with an instruction execution system, apparatus, or device. The machine readable medium can be a machine readable signal medium or a machine readable storage medium. The machine readable medium can include, but is not limited to, an electronic, magnetic, optical, electromagnetic, infrared, or semiconductor system, apparatus, or device, or any suitable combination of the above. More specific examples of the machine readable storage medium would include an electrical connection based on one or more wires, a portable computer diskette, a hard disk, a Random Access Memory (RAM), a Read Only Memory (ROM), an Erasable Programmable Read Only Memory (an EPROM or a flash memory), an optical fiber, a portable Compact Disc Read Only Memory (CD-ROM), an optical storage device, a magnetic storage device, or any suitable combination of the above.

Compared with the related art, the technical solution provided by the embodiment of the present disclosure has at least the following advantages: the audio processing method provided by the embodiment of the present disclosure includes, automatically carrying out tuning processing on an original audio in the video when entering a video editing page, and displaying, on the video editing page, a target control in a first state, which is used for indicating that the tuning processing is being carried out on the original audio. Intelligent tuning on the original audio can be realized, the quality of the original audio can be improved, and a better audio playback effect can be obtained; and the user can have a better interactive experience by prompting, via the target control in the first state, the user that the tuning processing is being currently carried out on the original video; in the process of carrying out the tuning processing on the original audio, the user's other edit operations on the target video will not be influenced, the user experience can be further improved, and the editing efficiency can be increased.

According to one or more embodiments of the present disclosure, there is provided an audio processing method, including: displaying a video editing page for a target video, in response to a trigger operation of entering the video editing page for the first time; if an original audio in the target video meets a preset condition, carrying out tuning processing on the original audio while displaying the video editing page, and displaying, on the video editing page, a target control in a first state, which is used for indicating that the tuning processing is being carried out on the original audio; and while carrying out the tuning processing on the original audio, performing an edit operation corresponding to an edit control on the target video in response to a trigger operation acting on the edit control, at least one said edit control is displayed on the video editing page.

According to one or more embodiments of the present disclosure, the audio processing method provided by the present disclosure further includes: playing the original audio while displaying the video editing page; and when completion of the tuning processing is detected, continuing to play the tuned audio from the playback progress point of the original audio at the completion of the tuning processing.

According to one or more embodiments of the present disclosure, there is provided an audio processing method, further including: controlling a state of the target control to be switched to a second state when completion of the tuning processing is detected, wherein the target control in the second state is used for indicating that the tuning processing for the original audio is completed.

According to one or more embodiments of the present disclosure, there is provided an audio processing method, further including: continuing to play the original audio from the current playback progress point, in response to an operation of switching the state of the target control from the second state to a third state;

wherein playing the audio after tuning processing on the video editing page, when the target control is in the second state.

According to one or more embodiments of the present disclosure, there is provided an audio processing method, further including: in response to a trigger operation acting on a publish control, publishing the target video including the audio after tuning processing if the target control is in the second state, and publishing the target video including the original audio if the target control is in the third state.

According to one or more embodiments of the present disclosure, there is provided an audio processing method, further including: in response to operations of exiting from the video editing page, entering a preset page, and returning to the video editing page from the preset page, displaying the video editing page, and controlling the state of the target control to be consistent with the state of the target control when exiting from the video editing page.

According to one or more embodiments of the present disclosure, there is provided an audio processing method, wherein the displaying the video editing page including the target control, in response to an operation of returning to the video editing page after exiting from the video editing page, includes:

in response to trigger operations of entering a video recording page after exiting from a video editing page, and returning to the video editing page after exiting from the video recording page, if the state of the target control is a first state or a second state when exiting from the video editing page, carrying out tuning processing on the changed original audio while displaying the video editing page, and displaying a target control in the first state on the video editing page; or, in response to trigger operations of entering a video recording page after exiting from a video editing page, and returning to the video editing page after exiting from the video recording page, if the state of the target control is a third state when exiting from the video editing page, displaying the video editing page;

and in response to an operation of switching the state of the target control from the third state to the second state, carrying out the tuning processing on the changed original audio, and displaying the target control in the first state on the video editing page.

According to one or more embodiments of the present disclosure, there is provided an audio processing method, and the displaying the video editing page including the target control in response to an operation of returning to the video editing page after exiting from the video editing page, includes:

in response to trigger operations of entering a video publishing page after existing from a video editing page, and returning to the video editing page after existing from the vide publishing page, displaying the video editing page including the target control, and controlling the state of the target control to be consistent with the state of the target control when exiting from the video editing page.

According to one or more embodiments of the present disclosure, there is provided an audio processing method, further including: displaying, on a recording page of the target video, target prompt information based on attributive characteristics of a preset reference audio and/or a recording behavior of a user, wherein, the audio in the target video is obtained by recording based on the preset reference audio.

According to one or more embodiments of the present disclosure, there is provided an audio processing method, and the original audio in the target video meeting a preset condition includes:
  there is a corresponding tuning resource for an original audio in the target video, and the original audio is recorded by wearing wired earphones throughout recording.

According to one or more embodiments of the present disclosure, there is provided an audio processing apparatus, including:
  a first displaying module for displaying a video editing page for a target video, in response to a trigger operation of entering the video editing page for the first time;
  a processing module for carrying out tuning processing on an original audio while displaying the video editing page, if the original audio in the target video meets a preset condition;
  wherein the first displaying module is further used for displaying, on the video editing page, a target control in a first state, which is used for indicating that the tuning processing is being carried out on the original audio;
  an editing module for performing, while the tuning processing is being carried out on the original audio, an edit operation corresponding to an edit control on the target video in response to a trigger operation acting on the edit control, at least one said edit control is displayed on the video editing page.

According to one or more embodiments of the present disclosure, the audio processing apparatus provided by the present disclosure further comprises: a playing module for playing the original audio while displaying the video editing page; and when completion of the tuning processing is detected, continuing to play the tuned audio from the playback progress point of the original audio at the completion of the tuning processing.

According to one or more embodiments of the present disclosure, the audio processing apparatus provided by the present disclosure further comprises: a controlling module for controlling the state of the target control to be switched to a second state when completion of the tuning processing is detected, wherein the target control in the second state is used for indicating that the tuning processing for the original audio is completed.

According to one or more embodiments of the present disclosure, in the audio processing apparatus provided by the present disclosure, the playing module is further used for: continuing to play the original audio from the current playback progress point in response to an operation of switching the state of the target control from the second state to a third state; wherein playing the audio after tuning processing on the video editing page, when the target control is in the second state.

According to one or more embodiments of the present disclosure, the audio processing apparatus provided by the present disclosure further comprises: a publishing module for, in response to a trigger operation acting on a publish control, publishing the target video including the audio after tuning processing if the target control is in the second state, and publishing the target video including the original audio if the target control is in the third state.

According to one or more embodiments of the present disclosure, in the audio processing apparatus provided by the present disclosure, the first displaying module is further used for: in response to operations of entering a preset page after exiting from the video editing page, and returning to the video editing page from the preset page, displaying the video editing page, and controlling the state of the target control to be consistent with the state of the target control when exiting from the video editing page.

According to one or more embodiments of the present disclosure, in the audio processing apparatus provided by the present disclosure, the first displaying module is specifically used for: in response to trigger operations of entering a video recording page after exiting from a video editing page, and returning to the video editing page after exiting from the video recording page, if the state of the target control is a first state or a second state when exiting from the video editing page, carrying out tuning processing on the changed original audio while displaying the video editing page, and displaying a target control in the first state on the video editing page; or in response to trigger operations of entering a video recording page after exiting from a video editing page, and returning to the video editing page after exiting from the video recording page, if the state of the target control is a third state when exiting from the video editing page, displaying the video editing page; and in response to an operation of switching the state of the target control from the third state to the second state, carrying out the tuning processing on the changed original audio, and displaying the target control in the first state on the video editing page.

According to one or more embodiments of the present disclosure, in the audio processing apparatus provided by the present disclosure, the first displaying module is specifically used for: there is a corresponding tuning resource for an original audio in the target video, and the original audio is recorded by wearing wired earphones throughout recording.

According to one or more embodiments of the present disclosure, the audio processing apparatus provided by the present disclosure further comprises: a second displaying module for displaying, on a recording page of the target video, target prompt information based on attributive characteristics of a preset reference audio and/or a recording behavior of a user; wherein, the audio in the target video is obtained by recording based on the preset reference audio.

According to one or more embodiments of the present disclosure, in an audio processing apparatus provided by the present disclosure, the original audio in the target video meets a preset condition, including: there is a corresponding tuning resource for the original audio in the target video, and the original audio is recorded by wearing wired earphones throughout recording.

According to one or more embodiments of the present disclosure, there is provided an electronic device, including:
  one or more processors;
  a memory for storing one or more programs;
  the one or more programs, when being executed by the one or more processors, cause the one or more processors to implement any of the audio processing methods provided by the present disclosure.

According to one or more embodiments of the present disclosure, there is provided a computer readable storage medium, on which a computer program is stored, which, when being executed by the processor, implements any of the audio processing methods provided by the present disclosure.

The embodiment of the present disclosure further provides a computer program product including a computer program or instructions which, when being executed by the processor, implement the above-mentioned audio processing method.

The above description is only the preferred embodiments of the present disclosure and an explanation for the technical principles employed. It will be appreciated by those skilled in the art that the scope of disclosure involved in the present disclosure is not limited to the technical solution formed by a particular combination of the above-described technical features, but also encompasses, without departing from the idea of the disclosure, other technical solution formed by any combination of the above-described technical features or equivalent features thereof, for example, the technical solution formed by a mutual replacement between the above-described features and the technical features disclosed in the present disclosure (not limited) having similar functions.

Further, while operations are depicted in a particular order, this should not be understood as requiring that such operations be performed in the particular order shown or in a sequential order. Under certain circumstances, multitasking and parallel processing may be advantageous. Likewise, while several specific implementation details are contained in the above discussion, these should not be construed as limitations on the scope of the present disclosure. Certain features that are described in the context of a separate embodiment can also be implemented in combination in a single embodiment. Conversely, various features that are described in the context of a single embodiment can also be implemented in multiple embodiments separately or in any suitable sub-combination.

Although the subject matter has been described in language specific to structural features and/or methodological acts, it should be understood that the subject matter defined in the appended Claims is not necessarily limited to the specific features or acts described above. Rather, the specific features and acts described above are only an example form of implementing the Claims.

What is claimed is:

1. An audio processing method, wherein the method comprises:
    displaying a video editing page for a target video, in response to a trigger operation of entering the video editing page for the first time;
    wherein in response to determining that an original audio in the target video meets a preset condition, carrying out tuning processing on the original audio while displaying the video editing page, and displaying, on the video editing page, a target control in a first state, which is used for indicating that the tuning processing is being carried out on the original audio;
    while carrying out the tuning processing on the original audio, performing an edit operation corresponding to an edit control on the target video in response to a trigger operation acting on the edit control, at least one said edit control being displayed on the video editing page; and
    wherein the method further comprises:
    controlling a state of the target control to switch to a second state in response to detecting a completion of the tuning processing, wherein the target control in the second state is configured to indicate that the tuning processing for the original audio is completed.

2. The method according to claim 1, wherein the method further comprises:
    playing the original audio while displaying the video editing page;
    in response to detecting the completion of the tuning processing, continuing to play the tuned audio from the playback progress point of the original audio at the completion of the tuning processing.

3. The method according to claim 1, wherein the method further comprises:
    continuing to play the original audio from the current playback progress point, in response to an operation of switching the state of the target control from the second state to a third state;
    wherein the audio after the tuning processing is played on the video editing page, when the target control is in the second state.

4. The method according to claim 3, further comprising:
    in response to a trigger operation acting on a publish control, publishing the target video including the audio after the tuning processing when the target control is in the second state, and publishing the target video including the original audio when the target control is in the third state.

5. The method according to claim 1, further comprising:
    displaying the video editing page including the target control, in response to an operation of returning to the video editing page after exiting from the video editing page, wherein the state of the target control is controlled to be consistent with the state of the target control when exiting from the video editing page in response to determining that the original audio is not changed.

6. The method according to claim 5, wherein, the displaying the video editing page including the target control, in response to an operation of returning to the video editing page after exiting from the video editing page, comprises:
    in response to trigger operations of entering a video recording page after exiting from the video editing page, and returning to the video editing page after exiting from the video recording page, when the state of the target control is the first state or the second state while exiting from the video editing page, carrying out the tuning processing on the changed original audio while displaying the video editing page, and displaying a target control in the first state on the video editing page; or,
    in response to trigger operations of entering a video recording page after exiting from the video editing page, and returning to the video editing page after exiting from the video recording page, when the state of the target control is the third state while exiting from the video editing page, displaying the video editing page;
    in response to an operation of switching the state of the target control from the third state to the second state, carrying out the tuning processing on the changed original audio, and displaying the target control in the first state on the video editing page.

7. The method according to claim 5, wherein, the displaying the video editing page including the target control, in response to an operation of returning to the video editing page after exiting from the video editing page, comprises:
 in response to trigger operations of entering a video publishing page after existing from the vide editing page, and returning to the video editing page after existing from the video publishing page, displaying the video editing page including the target control, and controlling the state of the target control to be consistent with the state of the target control when exiting from the video editing page.

8. The method according to claim 1, wherein the method further comprises:
 displaying, on a recording page of the target video, target prompt information based on at least one of attributive characteristics of a preset reference audio or a recording behavior of a user, wherein the audio in the target video is obtained by recording based on the preset reference audio.

9. The method according to claim 1, wherein, the original audio in the target video meets a preset condition, comprises:
 there is a corresponding tuning resource for the original audio in the target video, and the original audio is recorded by wearing wired earphones throughout recording.

10. An electronic device, wherein the electronic device comprises:
 one or more processors;
 storage for storing one or more programs;
 the one or more programs, when being executed by the one or more processors, cause the one or more processors to implement operations comprising:
 displaying a video editing page for a target video, in response to a trigger operation of entering the video editing page for the first time;
 wherein in response to determining that an original audio in the target video meets a preset condition, carrying out tuning processing on the original audio while displaying the video editing page, and displaying, on the video editing page, a target control in a first state, which is used for indicating that the tuning processing is being carried out on the original audio;
 while carrying out the tuning processing on the original audio, performing an edit operation corresponding to an edit control on the target video in response to a trigger operation acting on the edit control, at least one said edit control being displayed on the video editing page; and
 wherein the operations further comprise:
 controlling a state of the target control to switch to a second state in response to detecting a completion of the tuning processing, wherein the target control in the second state is configured to indicate that the tuning processing for the original audio is completed.

11. The electronic device according to claim 10, wherein the method operations further comprise:
 playing the original audio while displaying the video editing page;
 in response to detecting the completion of the tuning processing, continuing to play the tuned audio from the playback progress point of the original audio at the completion of the tuning processing.

12. The electronic device according to claim 10, wherein the operations further comprise:

continuing to play the original audio from the current playback progress point, in response to an operation of switching the state of the target control from the second state to a third state;
 wherein the audio after the tuning processing is played on the video editing page, when the target control is in the second state.

13. The electronic device according to claim 12, wherein the method operations further comprise:
 in response to a trigger operation acting on a publish control, publishing the target video including the audio after the tuning processing when the target control is in the second state, and publishing the target video including the original audio when the target control is in the third state.

14. A non-transitory computer readable storage medium, on which a computer program is stored, wherein the program, when being executed by the processor, causes the processor to implements operations comprising:
 displaying a video editing page for a target video, in response to a trigger operation of entering the video editing page for the first time;
 wherein in response to determining that an original audio in the target video meets a preset condition, carrying out tuning processing on the original audio while displaying the video editing page, and displaying, on the video editing page, a target control in a first state, which is used for indicating that the tuning processing is being carried out on the original audio;
 while carrying out the tuning processing on the original audio, performing an edit operation corresponding to an edit control on the target video in response to a trigger operation acting on the edit control, at least one said edit control being displayed on the video editing page; and
 wherein the operations further comprise:
 controlling a state of the target control to switch to a second state in response to detecting a completion of the tuning processing, wherein the target control in the second state is configured to indicate that the tuning processing for the original audio is completed.

15. The non-transitory computer readable storage medium according to claim 14, wherein the method operations further comprise:
 playing the original audio while displaying the video editing page;
 in response to detecting the completion of the tuning processing, continuing to play the tuned audio from the playback progress point of the original audio at the completion of the tuning processing.

16. The non-transitory computer readable storage medium according to claim 14, wherein the method operations further comprise:
 continuing to play the original audio from the current playback progress point, in response to an operation of switching the state of the target control from the second state to a third state;
 wherein the audio after the turning processing is played on the video editing page, when the target control is in the second state.

17. The non-transitory computer readable storage medium according to claim 16, wherein the operations further comprise:
 in response to a trigger operation acting on a publish control, publishing the target video including the audio after the tuning processing when the target control is in the second state, and publishing the target video including the original audio when the target control is in the third state.

* * * * *